June 18, 1935.  R. R. POYNTER  2,005,204
LAWN MOWER
Filed Feb. 23, 1933

INVENTOR.
Ralph R. Poynter,
BY
Hood + Hahn
ATTORNEYS

Patented June 18, 1935

2,005,204

UNITED STATES PATENT OFFICE 2,005,204

LAWN MOWER

Ralph R. Poynter, Lebanon, Ind.

Application February 23, 1933, Serial No. 657,993

14 Claims. (Cl. 56—255)

The present application relates to a lawn mower, and more particularly to a lawn mower of such character as to be capable of cutting tall tough grass or weeds as readily as it will cut shorter grass, and the like. The primary object of the invention is to provide a lawn mower which will be more efficient in operation than the ordinary type of lawn mower. A further object of the invention is to provide a lawn mower which shall be unusually quiet in operation, and yet fully effective to cut grass, weeds, and the like growing upon lawns, golf courses, in cemeteries, and elsewhere. A further object of the invention is to provide a lawn mower of the character described which shall be operable without too great exertion of force. A further object of the invention is to provide a device capable of cutting grass, weeds, and the like without the use of a stationary shear blade, or any other stationary cutting element. A further object of the invention is to provide a device of the class described in which the cutting is effected solely by a rotating blade, running entirely free of association with any other cutting element.

Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Figure 3:
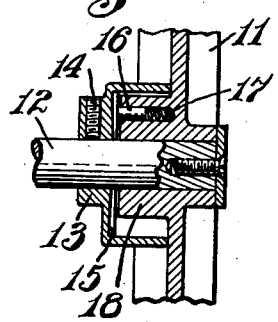
Fig. 3 is an enlarged section, taken at right angles to the section of Fig. 2, and illustrating a detail of construction.
Figure 4:
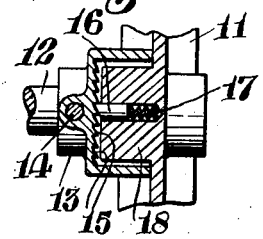
Fig. 4 is a sectional view taken in a plane at right angles to the plane of Fig. 3.

The illustrated embodiment of my invention comprises a pair of ground wheels 10 and 11 mounted upon an axle 12. Said wheels are preferably rotatably mounted upon the axle, and driving connections are provided between one or both of said wheels and said axle. In Fig. 3, one preferred form of driving connection is illustrated. A collar 13 is mounted upon the axle 12 adjacent the inner surface of the wheel 11, said collar being held rigidly in position on the axle by a set screw 14, or the like. The inner surface of said collar adjacent the wheel 11 is formed with a plurality of ratchet teeth 15 with which cooperates a plunger 16 slidable in a socket formed in the hub 18 of the wheel 11 and urged toward engagement with the ratchet teeth 15 by a spring 17. One or more of said plungers 16 may be provided in the hub 18, and, if desired, the above-described mechanism may be associated with each of the wheels 10 and 11, or it may be associated with one only of said wheels.

Figure 1:
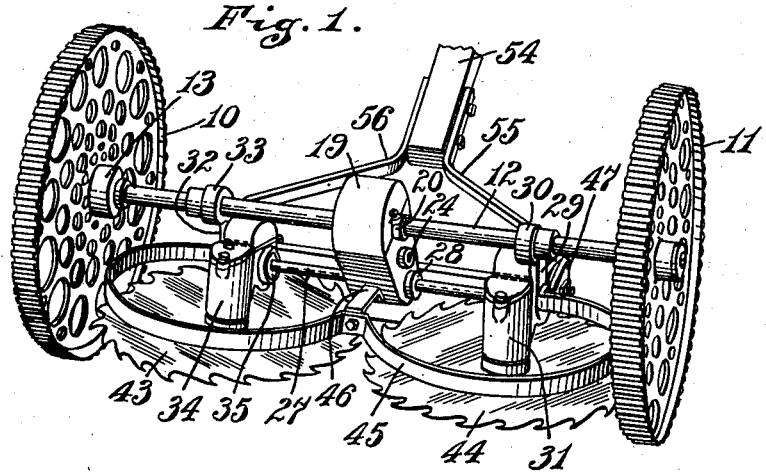
Fig. 1 is a perspective view of a lawn mower constructed in accordance with the present invention.

The ratchet teeth 15 are so designed that the plunger 16 will engage therewith to provide a driving connection between the wheel 11 and the axle 12 in one direction of relative rotation only. It will be seen that the structure illustrated in Fig. 3 comprises a one-way clutch; and, of course, the teeth 15 are so designed as to provide driving connection between the wheel 11 and the axle 12 only when the wheel 11 is rotated in counter-clockwise direction as viewed from the right of Fig. 1.

A housing 19 provides a bearing 20 which is journalled upon the axle 12. A driving pinion 21 is keyed to the axle 12 within the housing 19, and said pinion meshes with a gear 22 carried upon a stub axle 23 suitably journalled as at 24 within the housing 19. Integral with, or rigidly attached to, the gear 22 upon the shaft 23 is a gear 25 which meshes with a gear 26 carried upon a shaft 27 extending through the housing 19 and journalled as at 28 therein. Thus, a speed-increasing gear train is provided, connecting the axle 12 to drive the shaft 27.

An arm 29 terminates at one end in a collar 30 which is swung upon the axle 12. Said arm carries at its free end a housing 31.

A similar arm 32 terminates at one end in a collar 33 swung upon the axle 12; and said arm 32 carries at its free end a housing 34. The housings 31 and 34 are formed to provide bearings 35 in which are journalled the opposite ends of the shaft 27.

Within the housing 34, the shaft 27 carries a gear 36 meshing with a helical gear 37 reciprocably mounted upon a shaft 38 journalled within said housing 34 to rotate upon an axis substantially perpendicular to the axis of the axle 12. In the illustrated embodiment, said gear 37 is formed at its lower end with a plurality of teeth 39 adapted to be received in cammed sockets 40 formed in the upper surface of a collar 41 pinned on said shaft 38. The collar 41 is supported upon an anti-friction bearing 42, and said collar, in turn, supports the shaft 38.

Figure 2:
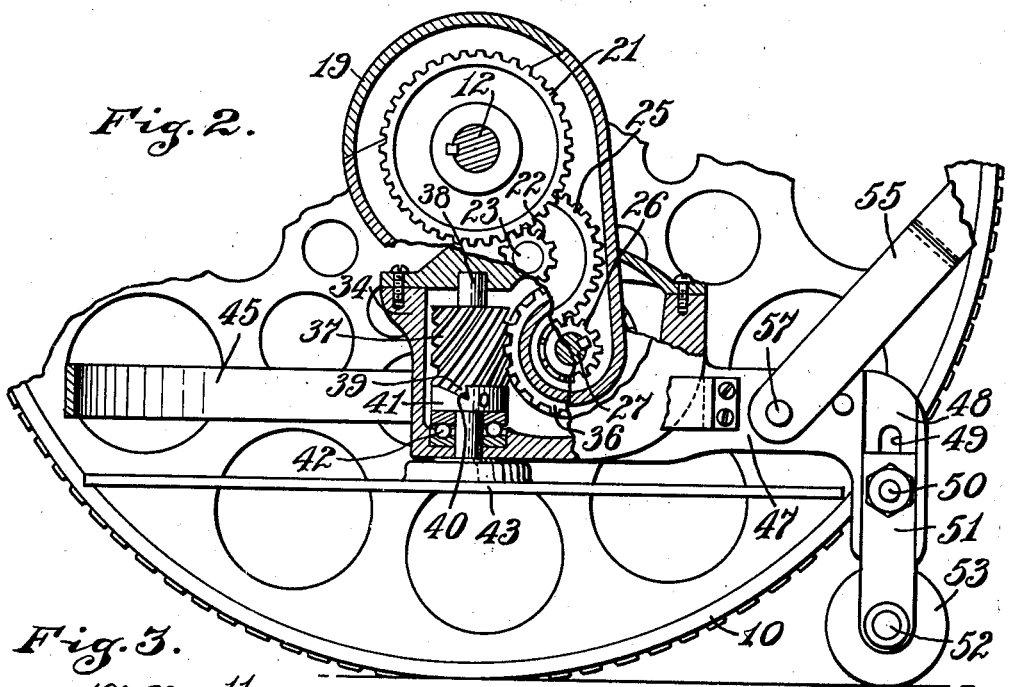
Fig. 2 is a fragmental transverse section, upon an enlarged scale, the section being taken in several parallel planes.

As is clearly shown in Fig. 2, the gear 37 is loosely mounted upon the shaft 38, said gear 37 being free to reciprocate and to rotate with respect to said shaft. Obviously, when said gear 37 is driven in a counter-clockwise direction, as viewed from above, the teeth 39 will be driven into the sockets 40 of the collar 41, whereby the collar 41 will be driven with said gear. Now, if the operator of the machine suddenly stops the machine after he has been moving it forwardly, the blades 43 and 44 will tend to continue to rotate. The gear 36, which meshes with the gear 37, is held against rotation by the train of gears which connects it with the axle 12. As the collar 41 continues to rotate, under the influence of the blade 43, the cooperating cam surfaces of the notches and the teeth 39 will force the gear 37 to move upwardly on the shaft 38. Such upward movement will result in a slight counter-clockwise movement of the gear 37, because of the co-operation of the gear 37 with the then stationary gear 36; but that rotation will be at a rate less than the rate of rotation of the collar 41.

It will be clear from the above that the gear 37 and the collar 41 cooperate to form an over-running clutch which, through movement of the gear 37 upwardly on the shaft 38, will permit the blade 43 to run freely in one direction without driving the gear train through which said blade is connected to the axle 12.

Said shaft 38 projects downwardly through the lower wall of the casing 34 and, without said casing, carries a toothed blade 43.

The shaft 27 carries, upon its end within the housing 31, a gear similar to the gear 36 meshing with a helical gear similar to the gear 37, but oppositely threaded; and the mechanism within the housing 31 is in other respects entirely similar to the mechanism within the housing 34, just described. A toothed blade 44, oppositely cut with respect to the blade 43, is carried upon the vertical shaft mounted in the housing 31.

It will be seen that, when the lawn mower is pushed forward, the blade 44 will be rotated in a clockwise direction, and the blade 43 will be rotated in a counter-clockwise direction, as viewed from above; and it will further be seen that said blades will be rotated at high angular velocity, and that they will overrun the wheels 10 and 11 because of the provision of the ratchet mechanisms illustrated in Fig. 3; or will overrun the axle 12 because of the provision of the one-way clutch mechanisms illustrated in Fig. 2.

I prefer to provide a guard 45 which follows more or less closely the conformation of the forward edges of the blades 43 and 44, projecting slightly beyond the same, whereby injury to persons or animals accidently coming into dangerous proximity to the rotating blades is obviated. Said guard is centrally secured to a bracket 46 carried by the housing 19, and its opposite ends may preferably be secured to the housings 31 and 34, or to extensions 47 leading rearwardly therefrom.

Said extensions 47 project rearwardly from the housings 31 and 34, and each of said extensions is formed with a substantially vertical slideway 48 in which is formed a longitudinally extending slot 49 adapted adjustably to receive a bolt 50 carried by an arm 51. The lower end of each of said arms 51 is formed with an aperture for receiving the axle 52 of a ground roller 53. It will be obvious that the relation of the leading edges of the blades 43 and 44 to the ground may be varied by adjustment of the bolts 50 in the slots 49.

A pusher bar 54 carries at its lower end two yoke elements 55 and 56, and the free ends of said yoke elements 55 and 56 are pivoted as at 57 to the extensions 47, at points intermediate the roller 53 and the vertical plane including the axle 12.

While I have illustrated an organization in which the axes of the shafts 38 intersect the axis of the axle 12, an arrangement in which said shafts 38 are spaced forwardly from the vertical plane including the axle 12 may sometimes be desirable. Such an arrangement will, under some circumstances, provide for more satisfactory adjustment of the blades 43 and 44 with respect to the ground.

It will be seen that the arms 29 and 32, together with the housings 31 and 34 and the extensions 47, constitute a frame swung upon the axle 12.

I claim as my invention:

1. In a device of the class described, a pair of ground wheels mounted on an axle and having a driving connection therewith, a toothed blade hung from said axle and rotatable on a substantially vertical axis, and speed-increasing means connecting said axle to drive said blade, said blade running free of association with any other cutting element.

2. In a device of the class described, a pair of ground wheels loosely mounted on an axle, a one-way clutch associated with each of said wheels and with said axle, a toothed blade hung from said axle and rotatable on a substantially vertical axis, and speed-increasing means connecting said axle to drive said blade, said blade running free of association with any other cutting element.

3. In a device of the class described, a pair of ground wheels mounted on an axle and having a driving connection therewith, a toothed blade hung from said axle and rotatable on a substantially vertical axis, and speed-increasing means connecting said axle to drive said blade, said means including a one-way clutch whereby said blade is driven by said means in one direction but may overrun said means, at times, said blade running free of association with any other cutting elements.

4. In a device of the class described, a pair of ground wheels loosely mounted on an axle, a one-way clutch associated with each of said wheels and with said axle, a toothed blade hung from said axle and rotatable on a substantially vertical axis, and speed-increasing means connecting said axle to drive said blade, said means including a one-way clutch whereby said blade is driven by said means in one direction but may overrun said means, said blade running free of association with any other cutting element.

5. In a device of the class described, an axle, a ground wheel mounted on said axle and having a driving connection therewith, a frame hung on said axle, a toothed blade mounted for rotation on said frame, transmission means connecting said axle to drive said blade, and means for oscillating said frame about the axis of said axle, whereby the space between the leading edge of said blade and the ground may be varied.

6. In a device of the class described, an axle, a ground wheel mounted on said axle and having a driving connection therewith, a frame hung on said axle, a toothed blade mounted for rotation on said frame, transmission means connecting said axle to drive said blade, a ground roll carried on said frame and separated from the axis of said blade by a vertical plane passing through said axle, and means for adjusting said roll vertically with respect to said frame.

7. In a device of the class described, an axle, a ground wheel mounted on said axle and having a driving connection therewith, a frame hung on said axle, a toothed blade mounted for rotation on said frame, transmission means connecting said axle to drive said blade, and a ground roll mounted on said frame and vertically adjustable with respect thereto, said roll being spaced from a vertical plane passing through said axle.

8. In a device of the class described, an axle, a ground wheel mounted on said axle and having a driving connection therewith, a frame oscillably mounted on said axle, a shaft carried on said frame parallel with said axle, a gear train connecting said axle to drive said shaft, a toothed blade carried on said frame and rotatable about a substantially vertical axis, a gear train connecting said shaft to drive said blade, and a one-way clutch included in one of said gear trains.

9. In a device of the class described, an axle, a ground wheel mounted on said axle and having a driving connection therewith, a frame oscillably mounted on said axle, a shaft carried on said frame parallel with said axle, a gear train connecting said axle to drive said shaft, two toothed blades carried on said frame and disposed substantially in the same substantially horizontal plane for rotation about spaced axes disposed substantially in the same vertical plane, said two blades comprising the only cutting elements in the organization, means connecting said shaft to drive both of said blades, and one-way clutch means connected in the driving train between said wheel and said blades.

10. In a device of the class described, an axle, a ground wheel mounted on said axle and having a driving connection therewith, a frame oscillably mounted on said axle, a shaft carried on said frame parallel with said axle, a gear train connecting said axle to drive said shaft, two non-overlapping, coplanar toothed blades carried on said frame for rotation about spaced axes, said two blades comprising the only cutting elements in the organization, means connecting said shaft to drive both of said blades, one-way clutch means connected in the driving train between said wheel and said blades, and a guard carried on said frame substantially coextensive with the serrated peripheries of said blades.

11. In a device of the class described, an axle, a ground wheel mounted on said axle and having a driving connection therewith, a frame oscillably mounted on said axle, a shaft carried on said frame parallel with said axle, a gear train connecting said axle to drive said shaft, two toothed blades carried on said frame for rotation about spaced axes, means connecting said shaft to drive both of said blades, and a one-way clutch interposed between said shaft and each of said blades.

12. In a device of the class described, an axle, a pair of ground wheels mounted on said axle, driving connections between one of said wheels and said axle, a pair of arms swung on said axle in spaced relation, a driving pinion keyed on said axle, a housing swung on said axle and enclosing said pinion, a speed-increasing gear train in said housing, one element of said train meshing with said pinion, a shaft journalled in said housing in spaced parallelism with said axle, a gear on said shaft in mesh with another element of said train, a housing carried by each of said arms, each of said last-named housings providing a bearing for an end of said shaft, a pinion on each end of said shaft within one of said last-named housings, a shaft substantially vertically mounted in each of said last-named housings and carrying a toothed blade without the housing, a helical gear within each of said last-named housings and meshing with its associated pinion, and one-way clutch means associating each of said helical gears with the vertically mounted shaft in its housing.

13. A lawn mower comprising an axle, a pair of ground wheels mounted on said axle, a frame oscillably mounted on said axle, a toothed blade mounted on said frame for rotation about a substantially vertical axis spaced forwardly from the vertical plane including said axle, transmission means connecting one of said wheels to drive said blade, a ground roller carried on said frame upon an axis spaced rearwardly from said plane, means for adjustably securing said roller in any one of a plurality of vertically spaced positions with respect to said frame, and a pusher bar connected to said frame at a point intermediate said plane and the axis of said roller.

14. A lawn mower comprising an axle, a pair of ground wheels mounted on said axle, a frame mounted on said axle, a plurality of toothed blades carried on said frame for rotation about spaced, substantially vertical axes, speed-increasing transmission means connecting one of said wheels to drive said blades, said means operating to drive adjacent ones of said blades in opposite directions, and one-way clutch means disposed between said transmission means and said blades.

RALPH R. POYNTER.